United States Patent
Song et al.

(10) Patent No.: US 9,492,981 B2
(45) Date of Patent: Nov. 15, 2016

(54) FILM FOR TIRE INNER LINER AND METHOD FOR MANUFACTURING THE SAME

(71) Applicant: KOLON INDUSTRIES, INC., Gwacheon-si (KR)

(72) Inventors: Ki-Sang Song, Seoul (KR); Yun-Jo Kim, Gumi-si (KR); Hyun Cho, Daegu (KR); Si-Min Kim, Daegu (KR)

(73) Assignee: KOLON INDUSTRIES, INC., Gwacheon-Si (KR)

( * ) Notice: Subject to any disclaimer, the term of this patent is extended or adjusted under 35 U.S.C. 154(b) by 379 days.

(21) Appl. No.: 14/346,069

(22) PCT Filed: Sep. 28, 2012

(86) PCT No.: PCT/KR2012/007953
§ 371 (c)(1),
(2) Date: Mar. 20, 2014

(87) PCT Pub. No.: WO2013/048206
PCT Pub. Date: Apr. 4, 2013

(65) Prior Publication Data
US 2014/0242370 A1    Aug. 28, 2014

(30) Foreign Application Priority Data

Sep. 30, 2011 (KR) .................. 10-2011-0100238
Sep. 28, 2012 (KR) .................. 10-2012-0108585

(51) Int. Cl.
| | |
|---|---|
| B29D 30/06 | (2006.01) |
| B29C 47/00 | (2006.01) |
| B60C 5/14 | (2006.01) |
| C08J 7/04 | (2006.01) |
| C08L 71/02 | (2006.01) |
| C09J 7/02 | (2006.01) |
| B60C 1/00 | (2006.01) |
| C09J 161/12 | (2006.01) |

(Continued)

(52) U.S. Cl.
CPC ....... B29D 30/0681 (2013.01); B29C 47/0021 (2013.01); B60C 1/0008 (2013.04);

(Continued)

(58) Field of Classification Search
None
See application file for complete search history.

(56) References Cited

U.S. PATENT DOCUMENTS 5,883,195 A * 3/1999 Couchoud ............... C08L 77/00
525/167
6,079,465 A * 6/2000 Takeyama ............ B60C 1/0008
152/510

(Continued)

FOREIGN PATENT DOCUMENTS

| JP | 08-259741 | 10/1996 |
| JP | 09165469 | 6/1997 |

(Continued)

OTHER PUBLICATIONS

Woong et al. (KR 20110001651 A). (Jan. 2011), (EPO—machine translation to English).*

(Continued)

*Primary Examiner* — David Sample
*Assistant Examiner* — Donald M Flores, Jr.
(74) *Attorney, Agent, or Firm* — Lex IP Meister, PLLC

(57) ABSTRACT

This disclosure relates to a film for a tire inner liner including a base film layer including a copolymer or a mixture of 50 wt % to 95 wt % of a polyamide-based resin and 5 wt % to 50 wt % of a polyether-based resin, and an adhesive layer including a resorcinol-formalin-latex (RFL)-based adhesive formed on at least one side of the base film layer, wherein a difference between a maximum thickness and an average thickness of the base film layer and a difference between a minimum thickness and the average thickness of the base film layer are respectively 6% or less of the base film, and a method for manufacturing the same. According to the present invention, an excellent gas barrier property may be achieved with a thin thickness, and thus the weight of a tire may become light and the mileage of automobiles may be improved, and as the inner liner film may have a uniform thickness, excellent forming stability and a tire having excellent durability may be provided.

19 Claims, 1 Drawing Sheet

(51) Int. Cl.
  *C08L 77/00* (2006.01)
  *C08G 81/00* (2006.01)
(52) U.S. Cl.
  CPC ............... *B60C 5/14* (2013.01); *C08J 7/047* (2013.01); *C08L 71/02* (2013.01); *C08L 77/00* (2013.01); *C09J 7/02* (2013.01); *C09J 7/0242* (2013.01); *C09J 161/12* (2013.01); *B29D 2030/0682* (2013.01); *B60C 2005/145* (2013.04); *C08G 81/00* (2013.01); *C08G 2261/126* (2013.01); *C08J 2377/00* (2013.01); *C08J 2461/12* (2013.01); *C08L 2205/05* (2013.01); *C09J 2201/622* (2013.01); *C09J 2461/00* (2013.01); *C09J 2471/006* (2013.01); *C09J 2477/006* (2013.01); *Y10T 428/2852* (2015.01)

(56) References Cited

U.S. PATENT DOCUMENTS

2002/0186612 A1* 12/2002 Murakami .......... B29C 47/0019
  366/79
2010/0258230 A1* 10/2010 Cantu ................ B29D 30/0681
  152/450

FOREIGN PATENT DOCUMENTS

| JP | 11-170339 | 6/1999 | |
| JP | 2005219565 | 8/2005 | |
| JP | 2008-504173 | 2/2008 | |
| JP | 4435253 | 1/2010 | |
| JP | 2011056812 | 3/2011 | |
| JP | WO 2012002108 A1 * | 1/2012 | ............ B29C 47/92 |
| KR | 20110001651 | 1/2011 | |
| KR | 20110001651 A * | 1/2011 | |
| WO | 2006-001660 | 1/2006 | |
| WO | 2011-118648 | 9/2011 | |

OTHER PUBLICATIONS

[NPL-1] "Ultramide®" BASF (2006). <http://www.performance-materials.basf.us/files/pdf/Properties%20of%20the%20Ultramid%20extrusion%20polyamides.pdf>.*

Inazawa et al. (WO 2012/002108 A1). (Jan. 2012), (EPO—machine translation to English).*

The Extended Search Report dated Jun. 9, 2015, of the corresponding EP Patent Application No. 12837146.5.

* cited by examiner

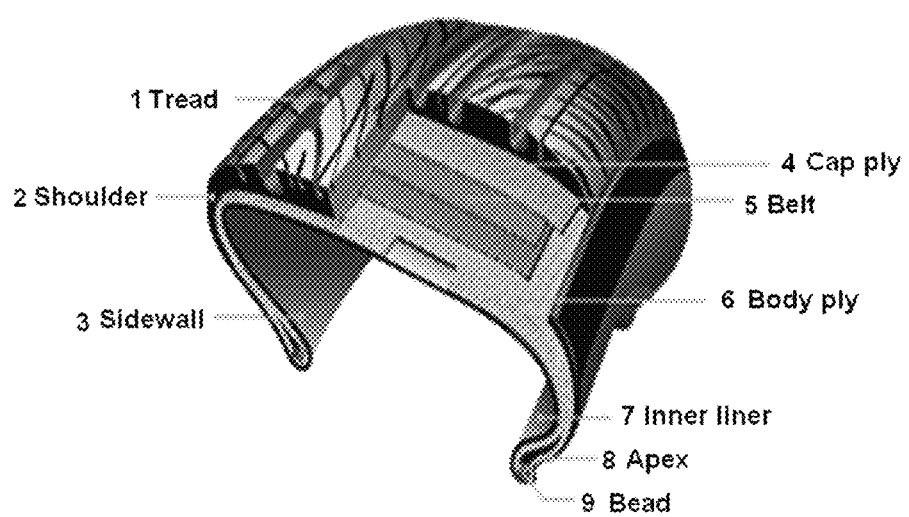

FILM FOR TIRE INNER LINER AND METHOD FOR MANUFACTURING THE SAME

TECHNICAL FIELD

The present invention relates to a film for a tire inner liner and a method for manufacturing the same. More particularly, the present invention relates to a film for a tire inner liner that may exhibit an excellent gas barrier property with a thin thickness and thus may make the weight of a tire light and improve mileage of automobiles, and that has excellent formability and running durability, and a method for manufacturing the same.

BACKGROUND OF THE ART

A tire withstands the weight of an automobile, reduces impact from the road, and transfers driving force or braking force of an automobile to the ground.

In general, a tire is a complex of fiber/steel/rubber, and has a structure as shown in FIG. 1.

Tread (1): a part contacting the road. It should afford frictional force required for driving, have good wear resistance, withstand external impact, and have low heat production.

Body ply, or carcass (6): a cord layer in the tire. It should support the vehicle weight, withstand impact, and have high fatigue resistance to bending and stretching while running.

Belt (5): located between the body plies, consists of steel wire in most cases, reduces external impact, and maintains a wide tread to afford excellent vehicle running stability.

Side wall (3): a rubber layer between a part below a shoulder (2) and bead (9). It protects the inner body ply (6).

Inner liner (7): located inside the tire instead of a tube, and prevents air leakage to enable a pneumatic tire.

Bead (9): square or hexagonal wire bundle formed of rubber-coated steel wire. It positions and fixes the tire to a rim.

Cap ply (4): a special cord located on a belt of a radial tire for some cars. It minimizes movement of the belt during running.

Apex (8): triangular rubber filler used to minimize dispersion of the bead, reduce external impact to protect the bead, and prevent air inflow during forming.

A tubeless tire where high pressure air of 30 to 40 psi is injected is commonly used without using a tube, and to prevent air leakage during automobile running, an inner liner having a high gas barrier property is positioned as the inner layer of the carcass.

Previously, a tire inner liner including rubber such as butyl rubber, halobutyl rubber, and the like having relatively low air permeability as a main ingredient was used, but to achieve a sufficient gas barrier property of the inner liner, the rubber content or inner liner thickness should be increased.

As the content and thickness of the rubber ingredient are increased, total weight of a tire is increased and the mileage of automobiles is reduced, and during vulcanization of a tire or running of automobiles, air pockets are generated between the inner rubber of a carcass layer and an inner liner, or the shape or properties of an inner liner is changed.

Therefore, various methods have been suggested to decrease the thickness and weight of the inner liner to increase mileage, to reduce changes in the shape or properties of the inner liner during vulcanization of a tire or running, and the like.

However, previously known methods have limitations in maintaining excellent air permeability and formability of a tire while sufficiently decreasing the thickness and weight of the inner liner.

In addition, the inner liner obtained by the previously known method often generated cracks due to repeated deformations during a manufacturing process of a tire or running of automobiles, and thus it did not have sufficient fatigue resistance.

Further, the previous tire inner liner did not have good adhesion to a carcass layer inside of a tire, and thus it was often separated or peeled off during a tire manufacturing process or running of automobiles.

Furthermore, the previous tire inner liner did not have a uniform thickness, and thus each part of the inner liner was non-uniformly deformed or elongated during a forming process.

Thus, mechanical properties of a tire inner liner were lowered, and during a tire manufacturing process or an automobile running process, a relatively largely elongated and thinned part was broken, and thus it was difficult to obtain a product having durability required for a tire.

DETAILED DESCRIPTION OF THE INVENTION

Technical Objectives

It is an object of the invention to provide a film for a tire inner liner that may exhibit an excellent gas barrier property with a thin thickness and thus may reduce the weight of a tire and improve mileage of automobiles, and provide a tire having excellent formability and durability.

It is another object of the invention to provide a method for manufacturing a film for a tire inner liner.

Technical Solutions

There is provided a film for a tire inner liner including a base film layer including a polyamide resin and a copolymer including polyamide-based segments and polyether-based segments, the polyether-based segments being included in the content of 15 wt % to 50 wt % based on total weight of the film, and an adhesive layer including a resorcinol-formalin-latex (RFL)-based adhesive formed on at least one side of the base film layer, wherein a difference between a maximum thickness and an average thickness of the base film layer, and a difference between a minimum thickness and the average thickness of the base film layer are respectively 6% or less of the average thickness.

There is also provided a method for manufacturing the film for a tire inner liner, including: supplying a mixture of a polyamide-based resin and a copolymer including polyamide-based segments and polyether-based segments to an extrusion die through a feeder that is maintained at a temperature of 50° C. to 100° C.; melting and extruding the supplied mixture at 230° C. to 300° C. to form a base film layer; and forming an adhesive layer including a resorcinol-formalin-latex (RFL)-based adhesive on at least one surface of the base film, wherein the polyether-based segment of the copolymer are included in the content of 15 wt % to 50 wt % based on total weight of the base film layer.

Hereinafter, a film for a tire inner liner and a manufacturing method thereof according to specific embodiments of the invention will be explained in detail.

According to one embodiment of the invention, a film for a tire inner liner including a base film layer including: a polyamide resin and a copolymer including polyamide-based segments and polyether-based segments, the polyether-based segments being included in the content of 15 wt % to 50 wt % based on total weight of the film; and an adhesive layer including a resorcinol-formalin-latex (RFL)-based adhesive formed on at least one side of the base film layer, is provided, wherein the difference between the maximum thickness and the average thickness of the base film layer and the difference between the minimum thickness and the average thickness of the base film layer are respectively 6% or less of the average thickness.

As a result of studies by the inventors, it was confirmed that a film for a tire inner liner including a base film layer formed using the polyamide-based resin and the copolymer including a specific content of polyether-based segments, and an adhesive layer including a resorcinol-formalin-latex (RFL)-based adhesive, may achieve an excellent gas barrier property with a thin thickness and thus reduce the weight of a tire and improve mileage of automobiles, has excellent formability and forming stability as well as excellent mechanical properties such as durability or fatigue resistance and the like, and may be firmly bonded to a tire without applying an additional vulcanization process or without significantly increasing the thickness of an adhesive layer.

Particularly, since the film for a tire inner liner obtained by the manufacturing method described below has uniform thickness over the whole area and substantially does not have comparatively thicker or thinner parts compared to the surrounding parts, band or island-shaped parts are not observed in the film with the naked eye.

Thus, the film for a tire inner liner may be uniformly formed over the whole area when it is elongated or deformed, it may prevent faults or damage of a film that may be generated due to the existence of comparatively thicker or thinner parts, and since it has uniform thickness and properties over the whole area of the inner liner, it may secure excellent running durability against repeated pressure or deformation and the like that are applied during automobile running.

Specifically, the difference between the maximum thickness and the average thickness and the difference between the minimum thickness and the average thickness of the base film layer may be respectively 6% or less, preferably 3% or less of the average thickness.

That is, the base film layer that is provided by the manufacturing method described below does not have excessively thick or thin parts compared to the average thickness and has uniform thickness.

Further, the deviation between the thickness at any point on the base film layer and the thickness at a point located within 1 cm from the any point may be within 2%, preferably within 1%.

That is, the base film layer has very uniform thickness over the whole area, and does not substantially include comparatively thicker or thinner parts compared to the surrounding parts.

The film for a tire inner liner has an excellent gas barrier property, high internal pressure retention performance, excellent formability, and the like, as well as uniform thickness.

It is considered that the excellent properties of the film for a tire inner liner result from the application of a base film layer including the copolymer including a specific content of polyether-base segments (including polyamide-based segments and polyether-based segments) together with the polyamide-based resin.

Specifically, the base film layer may have an excellent gas barrier property and a relatively low modulus by using a copolymer including a specific content of polyether-based segments that afford elastomeric properties together with the polyamide-based resin.

The polyamide-based resin included in the base film layer exhibits an excellent gas barrier property due to the unique molecular chain property, for example, it exhibits about a 10 to 20 times higher gas barrier property compared to a commonly used butyl rubber and the like with the same thickness and it exhibits a low modulus compared to other resins.

Further, since the polyether-based segments included in the copolymer exist while being bonded or dispersed between polyamide-based segments or polyamide-based resins, it may further lower the modulus of the base film layer, and it may inhibit an increase in stiffness of the base film layer and prevent crystallization at a high temperature.

Since the polyamide-based resin generally exhibits an excellent gas barrier property, it allows the base film layer to have low air permeability while having a thin thickness.

Further, since the polyamide-based resin exhibits a relatively low modulus compared to other resins, even if applied together with a copolymer including a specific content of polyether-based segments, an inner liner film exhibiting a relatively low modulus property may be obtained, thus improving tire formability.

In addition, since the polyamide-based resin has sufficient heat resistance and chemical stability, it may prevent deformation or degeneration of the inner liner film when exposed to chemical substance such as additives and the like or a high temperature condition applied during a tire manufacturing process.

Furthermore, the polyamide-based resin may be used together with a copolymer including polyamide-based segments and polyether-based segments, to exhibit relatively high reactivity to an adhesive (for example, a resorcinol-formalin-latex (RFL)-based adhesive).

Thereby, the inner liner film may be easily attached to a carcass part, and interface breakage due to heat or repeated deformations during a tire manufacturing process or running and the like may be prevented to afford sufficient fatigue resistance of the inner liner film.

The polyamide-based resin that can be used in the inner liner film may include a polyamide-based resin, for example, nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, and a copolymer of nylon 66/PPS, or an N-alkoxy alkylate thereof, for example, a methoxy methylate of 6-nylon, a methoxy methylate of 6-610-nylon, or a methoxy methylate of 612-nylon, and nylon 6, nylon 66, nylon 46, nylon 11, nylon 12, nylon 610, or nylon 612 may be preferable.

The polyamide-based resin may have relative viscosity (96% sulfuric acid solution) of 3.0 to 3.5, preferably 3.2 to 3.4.

If the viscosity of the polyamide-based resin is less than 2.5, sufficient elongation may not be secured due to a decrease in toughness, such that damage may be generated during a tire manufacturing process or automobile running, and if the viscosity of the polyamide-based resin is greater than 4.0, the modulus or viscosity of the manufactured base film layer may be unnecessarily increased, such that efficiency and economic feasibility of the manufacturing process may be lowered, and the tire inner liner may not have appropriate formability or elasticity.

The relative viscosity of the polyamide-based resin refers to a relative viscosity measured using a 96% sulfuric acid solution at room temperature.

Specifically, a specimen of a polyamide-based resin (for example, a 0.025 g specimen) is dissolved in a 96% sulfuric acid solution at various concentrations to prepared two or more measurement solutions (for example, a polyamide-based resin specimen is dissolved in a 96% sulfuric acid to concentrations of 0.25 g/dL, 0.10 g/dL, and 0.05 g/dL to prepare 3 measurement solutions), and then the relative viscosity of the measurement solutions (for example, the ratio of the average passing time of the measurement solutions to the passing time of the 96% sulfuric acid solution through a viscosity tube) may be obtained using a viscosity tube at 25° C.

In the manufacturing process of a base film, the polyamide-based resin may be included in the base film by mixing it with the above-explained copolymer and melting it, or it may be included in the film by mixing a precursor of the polyamide-based resin such as a monomer or oligomer and the like with the above-explained copolymer together with a reaction initiator, a catalyst, and the like, and reacting them.

Meanwhile, as explained above, since the copolymer including polyamide-based segments and polyether-based segments exists while being bonded or dispersed between polyamide-based resins, it may further lower the modulus of the base film layer, inhibit increase in stiffness of the base film layer, and prevent crystallization at a high temperature.

As the copolymer is included in the base film layer, the film for a tire inner liner may achieve high elasticity or elasticity recovery rate, while securing excellent mechanical properties such as durability, heat resistance, fatigue resistance, and the like.

Thus, the film for a tire inner liner may exhibit excellent formability, a tire using the same may not be physically damaged even in an automobile running process during which repeated deformations and high heat are continuously generated, and the properties or performances of the tire may not be lowered.

Meanwhile, the copolymer may include polyamide-based segments and polyether-based segments, and the polyether-based segments may be included in the content of 15 wt % to 50 wt %, preferably 20 wt % to 45 wt %, based on total weight of the film.

If the content of the polyether-based segments of the copolymer is less than 10 wt % based on total weight of the base film layer, the modulus of the tire inner liner film may increase to lower tire formability, or property deterioration due to repeated deformations may significantly occur.

If the content of the polyether-based segments of the copolymer is greater than 50 wt % based on total weight of the film, the gas barrier property of the inner liner film may be lowered, the inner liner may not be easily adhered to a carcass layer due to lowered reactivity to the adhesive, and a uniform film may not be easily manufactured due to increased elasticity of the base film layer.

The polyether-based segments may be bonded with the polyamide-based segments or may be dispersed between the polyamide-based resins, and they may inhibit growth of large crystals in the base film layer or prevent the base film layer from being easily broken in a tire manufacturing process or in an automobile running process.

The polyether-based segments may further lower the modulus of the film for a tire inner liner, and thus allow the inner liner film to be elongated or deformed according to the shape of a tire even if a low force is applied when forming a tire, thus enabling easy forming of a tire.

The polyether-based segments may inhibit an increase in stiffness of the film at a low temperature and prevent crystallization at a high temperature, prevent damage or tearing of an inner liner film due to repeated deformations, and improve recovery of an inner liner against deformation to inhibit wrinkle generation due to permanent deformation, thereby improving durability of a tire or an inner liner.

The polyamide-based segments may function for preventing a significant increase in the modulus property while affording mechanical properties over a certain level to the copolymer.

In addition, as the polyamide-based segments are applied, the base film layer may have low air permeability while having a thin thickness, and may have sufficient heat resistance and chemical stability.

The copolymer including polyamide-based segments and polyether-based segments may be a copolymer obtained by reacting polyamide-based monomers or oligomers with polyether-based monomers or oligomers, or may be a copolymer obtained by a polymerization reaction or cross-linking reaction of a polymer including polyether-based segments with a polymer including polyamide-based segments.

The copolymer including polyamide-based segments and polyether-based segments may be a block copolymer wherein the segments are bonded while forming a block, or it may be a random copolymer wherein the segments are irregularly bonded.

Further, the copolymer including polyamide-based segments and polyether-based segments may be a copolymer including a polymerization reaction product of a polymer including polyamide-based segments and a polymer including polyether-based segments, or it may be a cross-linked copolymer including a cross-linked reaction product of a polymer including polyamide-based segments and a polymer including polyether-based segments.

Meanwhile, in the base film layer, the copolymer including polyamide-based segments and polyether-based segments may be uniformly mixed, or it may be bonded at a partial area or over the whole area through polymerization or cross-linking.

In case the copolymer including polyamide-based segments and polyether-based segments includes a polymerization reaction product or a cross-linking reaction product of a polymer including polyamide-based segments and a polymer including polyether-based segments, the copolymer may include a polymer including polyamide-based segments or a polymer including polyether-based segments which do not participate in the polymerization or cross-linking reaction Thus, in the base film, a polymer including polyamide-based segments or a polymer including polyether-based segments may exist while being mixed or bonded with other components, as well as the polymerization reaction product or cross-liking reaction product.

In this case, the sum of the content of the polyether-based segments of the copolymer and the content of a polymer including polyether-based segments should also be within a range of 15 wt % to 50 wt % based on total weight of the base film layer, so that the properties of an inner liner film may be optimized.

The polyamide-based segments of the copolymer may include a repeat unit of the following Chemical Formula 1 or Chemical Formula 2.

[Chemical Formula1]

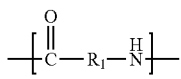

In the Chemical Formula 1, $R_1$ is a C1-20 linear or branched alkylene group or a C7-20 linear or branched arylalkylene group.

[Chemical Formula2]

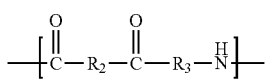

In the Chemical Formula 2, $R_2$ is a C1-20 linear or branched alkylene group, and $R_3$ is a C1-20 linear or branched alkylene group or a C7-20 linear or branched arylalkylene group.

In case a base film layer is manufactured using a copolymer including a polyamide-based repeat unit and a polyether-based repeat unit, the polyamide-based segment may be the polyamide-based repeat unit.

The polyamide-based segment may be derived from a polymer including polyamide-based segments or a polyamide-based monomer or oligomer which is used in the manufacturing process of the base film.

The polyether-based segments of the copolymer may include a repeat unit of the following Chemical Formula 3.

[Chemical Formula3]

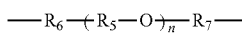

In the Chemical Formula 3, $R_5$ is a C1-10 linear or branched alkylene group, n is an integer of from 1 to 100, and $R_6$ and $R_7$ may be identical or different, and are independently a direct bond, —O—, —NH—, —COO—, or —CONH—.

In case a base film layer is manufactured using a copolymer including a polyamide-based repeat unit and a polyether-based repeat unit, the polyether-based segment may be the polyether-based repeat unit.

The polyether-based segment may be derived from a polymer including polyether-based segments or a polyether-based monomer or oligomer which is used in the process of manufacturing a base film.

The copolymer including polyamide-based segments and polyether-based segments may have a weight average molecular weight of 50,000 to 300,000, preferably 110,000 to 250,000.

If the weight average molecular weight of the copolymer is less than 50,000, sufficient mechanical properties required for use in an inner liner film may not be secured, while if the weight average molecular weight of the copolymer is greater than 300,000, the modulus or crystallinity of the inner liner film may excessively increase during high temperature heating, and elasticity or elasticity recovery rate required for an inner liner film may not be secured.

In a solution including a polymer material, light scattering occurs because of the polymer chain, and absolute weight average molecular weight of the polymer material may be measured using the light scattering. Particularly, using a MALS (multi-angle light scattering) system (Wyatt Company), parameters obtained in the measurement result may be applied to the following Rayleigh-Gans-Debye equation to obtain the absolute weight average molecular weight of the polymer material.

$K^*C/R(\theta)=1/MP(\theta)+2A_2C$  <Equation 1: Rayleigh-Gans-Debye equation>

In the Equation 1, M is molar mass, and is an absolute weight average molecular weight (Mw) for a polydispersed sample, $R_\theta$ is the excess Rayleigh ratio, $K^*=4\pi^2n_0^2(dn/dc)^2\lambda_0^{-4}N_A^{-1}$, C is polymer concentration (g/ml) in the solution, and $A_2$ is the second virial coefficient.

Further, in the $K^*$, $n_0$ is the refractive index of the solvent, $N_A$ is Avogadro's number, $\lambda_0$ is wavelength of a light source under vacuum, $P(\theta)=R_\theta/R_0$, and $R_0$ is incident light.

Meanwhile, it is preferable that the polyamide-based segment has similar properties, for example, relative viscosity, to the polyamide resin that is used.

Thus, the polyamide-based segments may have relative viscosity (96% sulfuric acid solution) of 3.0 to 3.5.

As the polyamide-based segments have a similar relative viscosity range to the polyamide resin, both components may be uniformly mixed without phase separation when the base film is manufactured, the manufactured base film layer may have uniform properties, and it may have a high gas barrier property and high internal pressure retention, excellent formability, high durability and fatigue resistance, and the like.

The polyether-based segment unit may be derived from a monomer, oligomer, or polymer having a relative weight average molecular weight of 500 to 10,000, preferably 1000 to 3000.

If the weight average molecular weight of the precursor of the polyether-based segment unit is less than 500, the actions of preventing growth of large crystals in the film for a tire inner liner or lowering the modulus may not be properly achieved.

If the weight average molecular weight of the precursor of the polyether-based segment unit is greater than 10,000, the gas barrier property of the inner liner may be lowered.

Meanwhile, the copolymer may include the polyamide-based segments and the polyether-based segments at a weight ratio of 6:4 to 3:7, preferably 5:5 to 4:6, while the content of the polyether-based segments is 10 wt % to 50 wt % based on total weight of the film.

As explained, if the content of the polyether-based segments is too low, the modulus of the inner liner film may increase to lower formability of a tire, or properties may be largely deteriorated due to repeated deformations.

Further, if the content of the polyether-based segments is too high, the gas barrier property of the inner liner film may be lowered, the inner liner may not be easily adhered to a carcass layer due to lowered reactivity to adhesive, and a uniform film may not be easily manufactured due to increased elasticity of the base film layer.

In the base film layer, the polyamide-based resin and the copolymer may be included at a weight ratio of 6:4 to 3:7, preferably 5:5 to 4:6.

If the content of the polyamide-based resin is too low, the density or gas barrier property of the inner liner film may be lowered.

Further, if the content of the polyamide-based resin is too high, the modulus of the inner liner film may become excessively high or formability of a tire may be lowered, the polyamide-based resin may be crystallized under a high temperature environment during a tire manufacturing process or automobile running, and cracks may be generated due to repeated deformations.

Meanwhile, due to the above-explained composition, the base film layer may include 1.3 to 2.5 Equ/E6 g, and preferably 1.5 to 2.4 Equ/E6 g of amine groups on the surface, and thereby the base film layer may have high reactivity to adhesives known to be used in a polymer resin film, and it may be firmly and uniformly adhered to the inside of a tire or to a carcass layer with a thin and light-weighted adhesive layer.

Particularly, in order to adhere the base film layer to a carcass layer more uniformly and stably, it is preferable to use the resorcinol-formalin-latex (RFL)-based adhesive of the above-explained composition.

As such, the film for a tire inner liner may exhibit improved adhesion to an adhesive or an adhesion layer due to the above-explained properties of the base film, and it may be firmly and uniformly adhered to a carcass layer with a thin and light weight adhesion layer without the need to deposit an additional adhesive layer or rubber layer.

The base film layer may have a thickness of 30 μm to 300 μm, preferably 40 μm to 250 μm, more preferably 40 μm to 200 μm.

Thereby, the film for a tire inner liner according to one embodiment of the invention may have low air permeability, for example oxygen permeability of 200 cc/(m$^2$·24 h·atm) or less, while having a thin thickness, compared to those previously known.

Meanwhile, the base film layer may be an unstretched film.

If the base film layer is an unstretched film, it may have a low modulus and high strain, and thus it may be appropriately applied in a tire forming process during which high expansion is generated.

Further, since crystallization hardly occurs in the unstretched film, damage such as cracks and the like may be prevented even if deformations repeatedly occur.

In addition, since the unstretched film does not have large property difference and orientation in a specific direction, an inner liner having uniform properties may be obtained.

As described below in the manufacturing method of a film for a tire inner liner, the base film may be manufactured in the form of an unstretched or non-oriented film by maximally preventing the orientation of the base film layer, for example, by viscosity control through optimization of melt-extrusion temperature, modification of die standard, control of winding speed, and the like.

If an unstretched film is applied for the base film layer, a film for an inner liner may be easily manufactured in a cylindrical or sheet type in a tire manufacturing process.

Particularly, in case an unstretched sheet-type film is applied for the base film layer, film manufacturing facilities need not be separately constructed according to tire size, and impact and wrinkles may be minimized during transfer and storage.

Further, in case the base film is manufactured in a sheet type, a process of adding an adhesive layer may be more easily conducted, and damage or deformation and the like that may be generated during a manufacturing process due to standard difference from a forming drum may be prevented.

Meanwhile, the base film may layer further include additives such as a heat resistant oxidant, a heat stabilizer, an adhesion improving agent, or a mixture thereof.

Specific examples of the heat resistant oxidant may include N,N'-hexamethylene-bis-(3,5-di-tert-butyl-4-hydroxy-hydrocinnamamide), for example, a commercialized product such as Irganox 1098, tetrakis[methylene(3,5-di-t-butyl-4-hydroxyhydrocinnamate)]methane, for example, a commercialized product such as Irganox 1010, 4,4'-dicumyl-di-phenyl-amine, for example, a commercialized product such as Naugard 445, and the like.

Specific examples of the heat stabilizer may include benzoic acid, triacetonediamine, N,N'-bis(2,2,6,6-tetramethyl-4-piperidyl)-1,3-benzenedicarboxamide, and the like.

However, the additives are not limited thereto, and those known to be usable for a tire inner liner film may be used without specific limitations.

Meanwhile, the adhesive layer including the resorcinol-formalin-latex (RFL)-based adhesive has excellent adhesion and adhesion maintaining performance to the base film layer and a tire carcass layer, and thus it may prevent rupture at an interface between an inner liner film and a carcass layer, which is generated by heat, or repeated deformations in a tire manufacturing process or a running process, to afford sufficient fatigue resistance to the film for an inner liner.

It is considered that the main properties of the adhesive layer result from inclusion of a resorcinol-formalin-latex (RFL)-based adhesive of a specific composition.

Previously, as an adhesive for a tire inner liner, a rubber type tie gum and the like was used, and thus an additional vulcanization process was required.

To the contrary, since the adhesive layer includes the resorcinol-formalin-latex (RFL)-based adhesive of a specific composition, it has high reactivity and adhesion to the base film, and it may be compressed under high temperature heating conditions to firmly adhere the base film to a carcass layer without significantly increasing the thickness.

Thus, the weight of a tire may become lighter, the mileage of automobiles may be improved, and separation between a carcass layer and an inner liner layer or between the base film and the adhesive layer may be prevented even if deformations occur repeatedly in a tire manufacturing process or in an automobile running process.

Further, since the adhesive layer may exhibit high fatigue resistance to physical/chemical deformations that may be applied in a tire manufacturing process or an automobile running process, it may minimize lowering of adhesion or other properties in a manufacturing process in high temperature conditions or in an automobile running process during which mechanical deformation is applied for a long time.

Furthermore, the resorcinol-formalin-latex (RFL)-based adhesive may exhibit good adhesion performance due to cross-linking between latex and rubber, it is physically a latex polymer and thus has a flexible property like rubber due to low hardness, and a methylol end group of the resorcinol-formalin polymer and a base film may be chemically bonded.

Thus, if the resorcinol-formalin-latex-(RFL)-based adhesive is applied to a base film, sufficient adhesion and high formability and elasticity may be achieved.

The resorcinol-formalin-latex (RFL)-based adhesive may include 2 wt % to 32 wt %, preferably 10 wt % to 20 wt % of a condensate of resorcinol and formaldehyde, and 68 wt % to 98 wt %, preferably 80 wt % to 90 wt % of a latex.

The condensate of resorcinol and formaldehyde may be obtained by mixing resorcinol and formaldehyde at a mole ratio of 1:0.3 to 1:3.0, preferably 1:0.5 to 1:2.5, and conducting condensation.

The condensate of resorcinol and formaldehyde may be included in the content of 2 wt % or more based on total weight of the adhesive layer in terms of a chemical reaction for excellent adhesion, and it may be included in the content of 32 wt % or less to secure adequate fatigue resistance.

The latex may be selected from the group consisting of natural rubber latex, styrene/butadiene rubber latex, acrylonitrile/butadiene rubber latex, chloroprene rubber latex, styrene/butadiene/vinylpyridine rubber latex, and a mixture thereof.

The latex may be included in the content of 68 wt % or more based on total weight of the adhesive layer for flexibility and an effective cross-linking reaction with rubber, and it may be included in the content of 98 wt % or less for a chemical reaction with a base film and stiffness of the adhesive layer.

The adhesive layer may further include at least one additive such as a surface tension control agent, a heat resistance agent, an antifoaming agent, a filler, and the like, in addition to the condensate of resorcinol and formaldehyde.

Although the surface tension control agent is applied for uniform coating of the adhesive layer, it may cause a decrease in adhesion when introduced in an excessive amount, and thus it may be included in the content of 2 wt % or less, or 0.0001 wt % to 2 wt %, preferably 1.0 wt % or less, or 0.0001 wt % to 0.5 wt %, based on total weight of the adhesive.

The surface tension control agent may be selected from the group consisting of a sulfonic acid salt anionic surfactant, a sulfate ester surfactant, a carboxylic acid salt anionic surfactant, a phosphate ester anionic surfactant, a fluorine-containing surfactant, a silicone-based surfactant, a polysiloxane-based surfactant, and a combination thereof.

The adhesive layer may have a thickness of 0.1 μm to 20 μm, preferably 0.1 μm to 10 μm, more preferably 0.2 μm to 7 μm, still more preferably 0.3 μm to 5 μm, and it may be formed on at least one surface of a film for a tire inner liner.

If the thickness of the adhesive layer is too thin, the adhesive layer itself may become thinner when a tire is inflated, cross-linking adhesion between a carcass layer and a base film may be lowered, and stress may be concentrated on a part of the adhesive layer to lower the fatigue property.

If the thickness of the adhesive layer is too thick, interface separation may occur in the adhesive layer to lower the fatigue property.

To adhere the inner liner film to a carcass layer of a tire, an adhesive layer is generally formed on one side of the base film, but in case a multi-layered inner liner film is applied, or adhesion to rubber on both sides is required according to a tire forming method and construction design, for example when an inner liner film covers a bead part, the adhesive layer may be preferably formed on both sides of the base film.

Meanwhile, the base film layer may further include additives such as heat resistant oxidant, heat stabilizer, adhesion improving agent, or a mixture thereof.

Specific examples of the heat resistant oxidant may include N,N'-hexamethylene-bis-(3,5-di-tert-butyl-4-hydroxy-hydrocinnamide), for example, a commercialized product such as Irganox 1098, tetrakis[methylene(3,5-di-t-butyl-4-hydroxyhydrocinnamate)]methane, for example, a commercialized product such as Irganox 1010, 4,4'-dicumyl-di-phenyl-amine, for example, a commercialized product such as Naugard 445), and the like.

Specific examples of the heat stabilizer may include benzoic acid, triacetonediamine, N,N'-bis(2,2,6,6-tetramethyl-4-piperidyl)-1,3-benzenedicarboxamide, and the like.

However, the additives are not limited thereto, and those known to be usable for a tire inner liner film may be used without specific limitations.

Meanwhile, the film for a tire inner liner may have maximum stress of 10 to 30 Mpa at 100% elongation at room temperature.

The film for a tire inner liner having such elongation property may have excellent formability in the process of manufacturing a tire, may stably maintain properties even if sever deformation is applied during forming of a tire, and may be elongated or deformed according to the shape of a tire with low force when forming a tire.

Further, the modulus or stiffness of a tire applying the film for a tire inner liner may not be significantly changed by running for a long time, and cracks of the internal structure of the tire, which may be generated during running, may be minimized.

In addition, the film for a tire inner liner may maintain optimum internal pressure even after use for a long period. For example, when 90 days-IPR (internal pressure retention) of a tire using the tire inner liner film is measured under 21° C. and 101.3 kPa conditions according to ASTM F1112-06, internal pressure retention as shown in the following Equation 2 may become 95% or more, that is, internal pressure decrease may be 5% or less. Thus, if the film for a tire inner liner is used, degradation of mileage and overturning accidents caused by low internal pressure may be prevented.

$$\text{Internal pressure retention (\%)} = \left\{ 1 - \frac{\begin{pmatrix}\text{Internal pressure of} \\ \text{the tire at first evaluation}\end{pmatrix} - \begin{pmatrix}\text{Internal pressure of the} \\ \text{tire after standing for 90 days}\end{pmatrix}}{\text{Internal pressure of the tire at first evaluation}} \right\} * 100 \quad \text{[Equation 2]}$$

Meanwhile, according to another embodiment of the invention, a method for manufacturing the film for a tire inner liner is provided, including supplying a mixture of a polyamide-based resin having a melt viscosity deviation of 3% or less, and a copolymer including polyamide-based segments and polyether-based segments and having a melt viscosity deviation of 3% or less, to an extrusion die through a feeder that is maintained at a temperature of 50° C. to 100° C., melting and extruding the supplied mixture at 230° C. to 300° C. to form a base film layer, and forming an adhesive layer including a resorcinol-formalin-latex (RFL)-based adhesive on at least one surface of the base film, wherein the polyether-based segments of the copolymer are included in the content of 15 wt % to 50 wt % based on total weight of the base film layer.

As the result of studies of the inventors, it was confirmed that if each melt viscosity deviation of a copolymer including polyamide-based segments and polyether-based segments and a polyamide-based resin, which are raw materials used in the manufacture of the base film, is uniformly controlled to 3% or less, and the mixture is supplied to an extrusion die through a feeder that is maintained at a temperature of 50° C. to 100° C. and is melted and extruded, a base film layer that has uniform thickness over the whole area of the film and does not substantially include comparatively thicker or thinner parts compared to the surrounding parts may be obtained.

Specifically, the difference between the maximum thickness and the average thickness and the difference between the minimum thickness and the average thickness of the base film layer may be respectively 6% or less, preferably 3% or less, of the average thickness.

Further, the deviation between the thickness at any point on the base film layer and the thickness at a point located within 1 cm from the any point may be within 2%, preferably within 1%.

As such, the film for a tire inner liner that is provided by the above manufacturing method has uniform thickness over the whole area, and does not substantially have relatively thicker or thinner parts compared to the surrounding parts.

Thus, the film for a tire inner liner may be uniformly elongated or deformed over the whole area of the film during the process of forming a tire and the like, faults or damage to the film that may be generated due to the existence of comparatively thicker or thinner parts may be prevented, and since it has uniform thickness and properties over the whole area, excellent running durability against repeated pressure and deformation and the like that are applied during automobile running may be secured.

As explained above, a film for a tire inner liner that is manufactured by forming an adhesive layer including the resorcinol-formalin-latex (RFL)-based adhesive on at least one surface of a base film layer formed using the polyamide-based resin and the specific copolymer (including 15 wt % to 50 wt % polyether-based segments based on total weight of the base film layer) may achieve an excellent gas barrier property with a thin thickness, and thus reduces the weight of a tire and improve mileage of automobiles, it may have excellent formability and forming stability due to the uniform thickness as well as excellent mechanical properties including high durability or fatigue resistance and the like, and it may be firmly bonded to a tire without applying an additional vulcanization process and without increasing the thickness of an adhesive layer.

As explained above, the copolymer including polyamide-based segments and polyether-based segments and the polyamide-based resin may respectively have uniform melt viscosity, and specifically, they may have a melt viscosity deviation of 3% or less.

The melt viscosity deviation refers to a difference between the average value and the maximum (or minimum) value of melt viscosity of the resin or copolymer.

That is, when the copolymer or polyamide-based resin has a melt viscosity deviation of 3% or less, it means that the mean of the maximum values of melt viscosity of the copolymer or polyamide-based resin is 103% or less, and the mean of the minimum values of melt viscosity is 97% or more.

The standard for measuring melt viscosity of the copolymer and polyamide-based resin is not specifically limited, it may differ according to the used copolymer and polyamide-based resin or applied process conditions, and for example, the melt viscosity may be measured at a temperature of 230° C. to 300° C. and at a shear rate of 100/sec to 300/sec.

Further, the melt viscosity of the copolymer or polyamide-based resin is not specifically limited, but the melt viscosity measured at a temperature of 260° C. and at a shear rate of 200/sec may be 5000 poise to 7000 poise.

However, as explained above, the copolymer and the polyamide-based resin may respectively have a melt viscosity deviation of 3% or less, preferably 2% or less.

As the copolymer and the polyamide-based resin each have uniform melt viscosity, in the step of mixing them, a step of keeping them in a feeder that is maintained at a constant temperature, or a step of melting and extruding them, and the like, the copolymer and the polyamide-based resin may be more uniformly mixed, agglomeration of the copolymer and the polyamide-based resin respectively or with each other and the resulting increase in size may be prevented, and thus a base film having a more uniform thickness may be formed.

The size of the copolymer or the polyamide-based resin that can be used in the manufacturing method is not specifically limited, and for example, each maximum diameter may be 2 mm to 3 mm.

When the copolymer and the polyamide-based resin are mixed or supplied to an extrusion step, it is preferable that they have uniform sizes or raw material chips are not agglomerated.

The details of the polyamide-based resin and the copolymer including polyamide-based segments and polyether-based segments are as explained above.

The polyamide-based resin may be included in the base film by mixing or compounding it with the above-explained copolymer and then melting them, or it may be included in the base film by mixing a precursor of the polyamide-based resin such as monomers or oligomers and the like with the above-explained copolymer together with a reaction initiator, a catalyst, and the like, and reacting them.

The copolymer including polyamide-based segments and polyether-based segments may be included in the base film by mixing or compounding the copolymer itself with the polyamide-based resin and then melting them.

The base film layer may be formed by mixing or compounding a polymer including polyamide-based segments and a polymer including polyether-based segments, conducting a polymerization reaction or a cross-linking reaction, and then mixing the product of the polymerization or cross-liking reaction with the polyamide-based resin and melting them.

The polymerization reaction or cross-linking reaction of the two kinds of polymers may be caused by mixing or compounding a polymer including polyamide-based segments and a polymer including polyether-based segments, and mixing the mixture or compounded substance with the polyamide-based resin and melting them, and by this process, the base film layer may be formed.

In the base film layer, the polyamide-based resin and the copolymer including polyamide-based segments and polyether-based segments may be uniformly mixed, or they may be bonded at a partial area or over the whole area through a polymerization reaction or a cross-linking reaction.

Meanwhile, the method for manufacturing a film for a tire inner liner may further include a step of mixing the polyamide-based resin and the copolymer at a weight ratio of 6:4 to 3:7.

If the content of the polyamide-based resin is too low, the density or gas barrier property of the base film layer may be lowered.

If the content of the polyamide-based resin is too high, the modulus of the base film layer may become excessively high or formability of a tire may be lowered, the polyamide-based resin may be crystallized in a high temperature environment during a tire manufacturing process or an automobile running process, and cracks may be generated due to repeated deformations.

The polyamide-based rein and the copolymer may be injected into a feeder after they are mixed, or they may be sequentially or simultaneously injected into a feeder and mixed.

A mixture of the polyamide-based resin and the copolymer may be supplied to an extrusion die through a feeder that is maintained at a temperature of 50° C. to 100° C.

As the feeder is maintained at a temperature of 50° C. to 100° C., the mixture of the polyamide-based resin and the copolymer may have appropriate properties such as viscosity and thus may be easily transferred to an extrusion die or other parts of an extruder, faulty feeding that is generated due to agglomeration of the mixture and the like may be prevented, and a more uniform base film may be formed in the subsequent melting and extrusion process.

If the feeder is maintained at a temperature of less than 50° C., raw material supplied to an extruder may rapidly slip on the surface of the screw of the extruder, or raw material may be non-uniformly supplied to the extruder, and if it is maintained at a temperature of greater than 100° C., raw material may be fused on the surface of the screw of the extruder, and thus faulty feeding may be generated.

The feeder is a part that functions to supply raw material injected in an extruder to an extrusion die or other parts, the construction thereof is not specifically limited, and it may be a common feeder included in an extruder for manufacturing a polymer resin.

Meanwhile, by melting and extruding the mixture that is supplied to an extrusion die through the feeder at 230° C. to 300° C., a base film layer may be formed.

A temperature for melting the mixture may be 230° C. to 300° C., preferably 240° C. to 280° C.

Although the melting temperature should be higher than the melting point of the polyamide-based compounds, if it is too high, carbonization or decomposition may occur to lower properties of a film, bonding between the polyether-based resins may occur, or orientation may be generated in a fiber arrangement direction, and thus too high a melting temperature may be unfavorable for manufacturing an unstretched film.

As the extrusion die, those known to be usable for extruding a polymer resin may be used without specific limitations, but a T-type die may be preferably used so that the thickness of the base film may become more uniform or orientation may not be generated in the base film.

To control the thickness of the base film layer more uniformly, the die gap of the extrusion die may be controlled to 0.3 mm to 1.5 mm.

In the step of forming the base film, if the die gap is too small, shear pressure and shear stress in the melt-extrusion process may become too high, and thus uniform shape of the extruded film may not be formed and productivity may be lowered. Further, if the die gap is too large, stretching of the melt extruded film may significantly occur to generate orientation, and a property difference between the machine direction and the transverse direction of the manufactured base film may become large.

Furthermore, in the manufacturing method of the film for a tire inner liner, the thickness of the manufactured base film may be continuously measured, and the measurement result is fed back to control the part of the extrusion die where non-uniform thickness appears, for example, a lip gap adjustment bolt of the T-die, thus reducing deviation of the manufactured base film, thereby obtaining a film having a more uniform thickness.

The measurement of the film thickness-feed back-control of the extrusion die may constitute an automated process step by using an automated system, for example an Auto Die system and the like.

Meanwhile, the manufacturing method of the film for a tire inner liner may further include a step of solidifying the base film layer formed through melting and extrusion in a cooling part maintained at a temperature of 5° C. to 40° C., preferably 10° C. to 30° C.

By solidifying the base film layer formed through melting and extrusion in a cooling part maintained at a temperature of 5° C. to 40° C., a film with more a uniform thickness may be provided.

If the base film layer formed through melting and extrusion is folded or attached to a cooling part maintained at the appropriate temperature, orientation may not substantially occur, and the base film layer may be provided as an unstretched film.

If the temperature of the cooling part is less than 5° C., moisture coagulation may occur in the cooling part and non-uniform cooling may be generated, and thus the base film layer formed by melting and extrusion may not be easily adhered to the cooling part.

If the temperature of the cooling part is greater than 40° C., it may be difficult to sufficiently cool the base film layer formed by melting and extrusion, and if the temperature of the cooling part is too high, the base film layer may stick to the surface of the cooling part.

Specifically, the solidifying step may include uniformly attaching the base film formed through melting and extrusion to a cooling roll maintained at a temperature of 5° C. to 40° C., using an air knife, an air nozzle, an electrostatic pinning device, or a combination thereof.

In the solidifying step, by attaching the base film formed through melting and extrusion to a cooling roll using an air knife, an air nozzle, an electrostatic pinning device, or a combination thereof, blowing of the base film layer after extrusion or partially non-uniform cooling, and the like may be prevented, and thus a film having more uniform thickness may be formed, and areas having a relatively thick or thin thickness compared to the surrounding parts may not be substantially formed in the film.

Meanwhile, the molten material extruded under the specific die gap conditions may be attached or folded to a cooling roll installed at a horizontal distance of 10 mm to 150 mm, preferably 20 mm to 120 mm from the die outlet, to eliminate stretching and orientation.

The horizontal distance from the die outlet to the cooling roll may be a distance between the die outlet and a point where discharged molten material is folded to the cooling roll.

If the linear distance between the die outlet and the cooling roll attaching point of the molten film is too small, uniform flow of melt extruded resin may be disturbed and the film may be non-uniformly cooled, and if the distance is too large, an effect of inhibiting film stretching may not be achieved.

In the step of forming the base film, except for the above-explained steps and conditions, film extrusion conditions commonly used for manufacturing of a polymer film, for example, screw diameter, screw rotation speed, line speed, and the like may be appropriately selected.

In the step of forming the base film, the thickness of the base film may be controlled to 30 μm to 300 μm by controlling the thickness of discharged molten resin sheet by controlling the discharge amount of the extruder, the width or gap of die, and the winding speed of the cooling roll, or by uniformly adhering and cooling it using an air knife, an air nozzle, or an electrostatic edge pinning apparatus.

Meanwhile, the manufacturing method of the film for a tire inner liner may include a step of forming an adhesive layer including a resorcinol-formalin-latex (RFL)-based adhesive on at least one side of the base film layer.

The adhesive layer including the resorcinol-formalin-latex (RFL)-based adhesive may be formed by coating the resorcinol-formalin-latex (RFL)-based adhesive on one surface of the base film layer, or it may be formed by laminating an adhesive film including the resorcinol-formalin-latex (RFL)-based adhesive on one side of the base film layer.

Preferably, the step of forming the adhesive layer may be progressed by coating the resorcinol-formalin-latex (RFL)-based adhesive on one surface or both surfaces of the base film, and then drying it.

The adhesive layer may have a thickness of 0.1 μm to 20 μm, preferably 0.1 μm to 10 μm.

The resorcinol-formalin-latex (RFL)-based adhesive may include 2 wt % to 32 wt % of a condensate of resorcinol and formaldehyde and 68 wt % to 98 wt %, preferably 80 wt % to 90 wt %, of a latex.

The details of the resorcinol-formalin-latex (RFL)-based adhesive with the above specific composition are as explained above.

A commonly used coating method or apparatus may be used to coat the adhesive without specific limitations, but knife coating, bar coating, gravure coating, spray coating, or immersion coating may be used.

However, knife coating, gravure coating, or bar coating may be preferable for uniform coating of the adhesive.

After forming the adhesive layer on one side or both sides of the base film, drying and an adhesive reaction may be simultaneously progressed, but a heat treatment reaction step may be progressed after the drying step considering reactivity of the adhesive, and the step of forming the adhesive layer and drying and reacting may be applied several times for thickness of the adhesive layer or application of a multi-layered adhesive.

After coating the adhesive on the base film, a heat treatment reaction may be conducted by solidifying and reacting at 100° C. to 150° C. for approximately 30 seconds to 3 minutes.

In the step of forming the copolymer or mixture, or in the step of melting and extruding the copolymer, additives such as a heat resistant antioxidant, heat stabilizer, and the like may be additionally added.

The details of the additives are as explained above.

Advantageous Effect of the Invention

According to the present invention, a film for a tire inner liner that may achieve an excellent gas barrier property with a thin thickness and thus reduce the weight of a tire and improve mileage of automobiles, that has uniform thickness, and that has excellent forming stability and running durability, and a method for manufacturing the same may be provided.

BRIEF DESCRIPTION OF THE DRAWINGS

FIG. 1 schematically shows the structure of a tire.

DETAILS FOR PRACTICING THE INVENTION

Hereinafter, preferable examples are presented, but these examples are only to illustrate the invention and the scope of the invention is not limited thereto.

EXAMPLES AND COMPARATIVE EXAMPLES

Manufacture of a Film for a Tire Inner Liner

Example 1

(1) Manufacture of a Base Film 40 wt % of polyamide-based resin (nylon 6) having relative viscosity of 3.4 and 40 wt % of a copolymer having relative weight average molecular weight of 150,000 (synthesized using 60 wt % of amine-terminated polyethylene glycol and 40 wt % of nylon 6 resin) were mixed.

The polyamide-based resin and the elastomer resin respectively have a maximum diameter of 2 mm to 3 mm, and melt viscosity of 6000 poise at a temperature of 260° C. and at a shear rate of 200/sec, and the melt viscosity deviation of each of the polyamide-based resin and the copolymer resin (ratio difference between the maximum value (or minimum value) and the mean value of the melt viscosity of the resin or copolymer) was controlled to 2%.

The mixture was dried while controlling so that the chips are not agglomerated at a temperature of 100° C. or less, and then supplied to an extrusion die while controlling the temperature of the feeder to 50° C. to 100° C. to prevent fusion of the mixture to the screw of the extruder and the resulting faulty feeding.

The supplied mixture was extruded through a T type die (die gap—1.0 mm) at a temperature of 260° C. while maintaining uniform flow of molten resin, and the molten resin was cooled and solidified to a film with uniform thickness using an air knife on the surface of a cooling roll that is controlled to 25° C.

An unstretched base film having the thickness as described in the following Table 1 was obtained at a speed of 15 m/min without passing stretching and heat treatment sections.

(2) Coating of Adhesive

Resorcinol and formaldehyde were mixed at a mole ratio of 1:2, and then condensed to obtain a condensate of resorcinol and formaldehyde.

12 wt % of the condensate of resorcinol and formaldehyde and 88 wt % of styrene/butadiene-1,3/vinylpyridine were mixed to obtain a resorcinol-formalin-latex (RFL)-based adhesive at a concentration of 20%.

The resorcinol-formalin-latex (RFL)-based adhesive was coated on the base film to a thickness of 1 μm using a gravure coater, dried at 150° C. for 1 minute, and reacted to form an adhesive layer.

Example 2

A film for a tire inner liner was manufactured by the same method as Example 1, except that 40 wt % of a polyamide-based resin (nylon 6) having relative viscosity of 3.4 and 60 wt % of a copolymer resin having a relative weight average molecular weight of 150,000 (synthesized using 40 wt % of amine-terminated polyethylene glycol and 60 wt % of nylon 6 resin) were mixed.

Example 3

A film for a tire inner liner was manufactured by the same method as Example 1, except that 60 wt % of a polyamide-based resin (nylon 6) having relative viscosity of 3.4 and 40 wt % of a copolymer resin having a relative weight average molecular weight of 150,000 (synthesized using 50 wt % of amine-terminated polyethylene glycol and 50 wt % of nylon 6 resin) were mixed.

Comparative Example 1

A releasing agent and a processing agent were introduced into butyl rubber and mixed to obtain a film for a tire inner liner having the thickness as described in the following Table 1, and adhesive rubber (tie gum) with a thickness of 1 μm was formed on the inner liner film.

Comparative Example 2

(1) Manufacture of a Base Film

A film for a tire inner liner was manufactured by the same method as Example 1, except that 80 wt % of a polyamide-based resin (nylon 6) having relative viscosity of 3.4 and 20 wt % of a copolymer resin having a relative weight average molecular weight of 150,000 (synthesized using 40 wt % of amine-terminated polyethylene glycol and 60 wt % of nylon 6 resin) were mixed.

(2) Coating of Adhesive

A resorcinol-formalin-latex (RFL)-based adhesive was prepared by the same method as Example 1, and it was coated on the base film and dried to form an adhesive layer with a thickness of 1 μm.

Comparative Example 3

(1) Manufacture of a Base Film

A film for a tire inner liner was manufactured by the same method as Example 1, except that 20 wt % of a polyamide-based resin (nylon 6) having relative viscosity of 3.4 and 80 wt % of a copolymer resin having a relative weight average molecular weight of 150,000 (synthesized using 70 wt % of amine-terminated polyethylene glycol and 30 wt % of nylon 6 resin) were mixed.

(2) Coating of Adhesive

A resorcinol-formalin-latex (RFL)-based adhesive was prepared by the same method as Example 1, and it was coated on the base film and dried to form an adhesive layer with a thickness of 1 μm.

Comparative Example 4

A film for a tire inner liner was manufactured by the same method as Example 1, except that the temperature of the feeder was controlled to 120° C., and the mixture was extruded using a circular die.

Experimental Example

Measurement of Properties of a Film for a Tire Inner Liner

Experimental Example 1

Measurement of Thickness of a Base Film

A specimen of width of 1 m×length of 1 m was obtained from each tire inner liner film of the examples and comparative examples.

At points of 1 cm intervals in the width and length directions of the specimen, thicknesses were measured.

The maximum value, minimum value, and mean value of the measured thicknesses were calculated, and the maximum value (A1) and the minimum value (A2) of thickness difference between one point and its neighboring point among the measurement points were calculated.

Experimental Example 2

Measurement of Stress at 100% Elongation at Room Temperature

For the inner liner films obtained in the examples and comparative examples, stress generated when the film elongates 100% in the MD (machine direction) at room temperature was measured.

The specific measurement method is as follows.

(1) Measuring apparatus: Universal testing machine (Model 4204, Instron Company)

(2) Measuring conditions: 1) head speed 300 mm/min, 2) grip distance 30 mm, 3) sample width 30 mm, 4) 25° C. and 60 RH % atmosphere.

(3) The stress was measured each 5 times, and the measured value was calculated.

Experimental Example 3

Oxygen Permeability Test

Oxygen permeability of the tire inner liner films obtained in the examples and comparative examples was measured. The specific measurement method is as follows.

(1) Oxygen permeability: measured according to ASTM D 3895, using oxygen permeation analyzer (Model 8000, Illinois Instruments Company) under a 25° C. 60 RH % atmosphere.

Experimental Example 4

Measurement of Internal Pressure Retention

Tires were manufactured using the tire inner liner films of the examples and comparative examples, applying the 205R/65R16 standard.

Further, 90 days-IPR (internal pressure retention) of the tires were measured and compared/evaluated as shown in the following Equation 2, under a 21° C. temperature and a 101.3 kPa pressure according to ASTM F 1112-06.

$$\text{Internal pressure retention (\%)} = \left\{1 - \frac{\text{Internal pressure of the tire at first evaluation} - \text{Internal pressure of the tire after standing for 90 days}}{\text{Internal pressure of the tire at first evaluation}}\right\} * 100 \quad \text{[Equation 2]}$$

The results of the Experimental Examples 1 to 4 are described in the following Table 1.

TABLE 1

Results of Experimental Examples 1 to 4

| | Example 1 | Example 2 | Example 3 | Example 1 | Example 2 | Example 3 | Example 4 |
|---|---|---|---|---|---|---|---|
| Mean of thicknesses of base film layer (um) | 82.1 | 81.3 | 80.5 | 83 | 79.4 | 80.4 | 78.2 |
| Maximum value of thicknesses of base film layer (μm) | 84.3 | 83.2 | 81.8 | 75.5 | 82.3 | 83.3 | 85.7 |
| Minimum value of thicknesses of base film layer (μm) | 80.5 | 79.7 | 79.6 | 91.3 | 78.1 | 77.8 | 73.1 |
| A1 (μm) | 0.9 | 0.8 | 0.6 | 3.5 | 0.5 | 1.1 | 2.5 |
| A2 (μm) | 0.1 | 0.1 | 0.0 | 1.2 | 0.0 | 0.3 | 0.2 |
| Stress @ 100% (MPa) | 15 | 17 | 18 | 7 | 37 | 13 | 13 |
| Oxygen permeability (cc/m² * 24 h * atm) | 78 | 70 | 62 | 350 | 34 | 150 | 75 |
| Internal pressure retention (%) | 95 | 96 | 96 | 75 | No tire forming | 89 | 92 (crack generation) |

As shown in Table 1, it was confirmed that the tire inner liner films of the examples have uniform thickness over the whole area, and the thickness deviation between 2 neighboring points within 1 cm is within 2%.

It was also confirmed that the tire inner liner films of the examples exhibit an excellent gas barrier property (low oxygen permeability) with a thin thickness, exhibit excellent internal pressure retention, and generate low stress at 100% elongation, and thus when practically used for forming a tire, it may exhibit excellent formability.

To the contrary, the tire inner liner film of Comparative Example 1 manufactured using butyl rubber had non-uniform thickness, and due to the property of soft rubber of being easily deformed by pressure, there were a lot of difficulties in constantly measuring the thickness of the film by pressure contact.

Further, it was confirmed that when the tire inner liner film of the comparative example has similar thickness to the tire inner liner film of the example, it has a gas barrier property that makes it difficult to be used for an inner liner (high oxygen permeability).

In Comparative Examples 2 and 3 wherein process conditions identical to the examples were applied but the compositions of the used raw materials were different, uniformity of a similar range to the examples was exhibited, but in Comparative Example 2, very high stress was generated at 100% elongation and thus practical tire forming was impossible, and in Comparative Example 3, the film had a gas barrier property that makes it difficult to be used as an inner liner (high oxygen permeability).

Further, in Comparative Example 4 wherein the temperature of the feeder and the kind of a die were different, faulty feeding was generated in the manufacturing process, the thickness of the manufactured base film was not uniform, and the thickness deviation between two neighboring points within 1 cm in the film exceeded 2%.

Thus, in a tire manufactured using the film of Comparative Example 4, it was observed that cracks are generated in a part of the inner liner.

What is claimed is:
1. A film for a tire inner liner, comprising:
   a base film layer comprising a polyamide resin and a copolymer comprising polyamide-based segments and polyether-based segments, the polyether-based segments being included in a content of 15 wt % to 50 wt % based on total weight of the film; and
   an adhesive layer comprising a resorcinol-formalin-latex (RFL)-based adhesive formed on at least one side of the base film layer,
   wherein a difference between the maximum thickness and the average thickness of the base film layer and a difference between the minimum thickness and the average thickness of the base film layer are respectively 6% or less of the average thickness, wherein the copolymer comprising polyamide-based segments and polyether-based segments has a weight average molecular weight of 50,000 to 300,000.

2. The film for a tire inner liner according to claim 1, wherein a difference between the thickness of the base film layer at a first point and the thickness of the base film layer at a second point located within 1 cm from the first point is within 2% relative to the thickness of the base film layer at the first point.

3. The film for a tire inner liner according to claim 1, wherein the polyamide-base resin is at least one selected from the group consisting of nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, a copolymer of nylon 66/PPS, a methoxy methylate of 6-nylon, a methoxy methylate of 6-610-nylon, and a methoxy methylate of 612-nylon.

4. The film for a tire inner liner according to claim 1, wherein the polyamide-based resin has a relative viscosity of 3.0 to 3.5 (96% sulfuric acid solution).

5. The film for a tire inner liner according to claim 1, wherein the polyamide-based segment of the copolymer includes a repeat unit of the following Chemical Formula 1 or Chemical Formula 2:

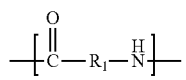
[Chemical Formula 1]

wherein, in the Chemical Formula 1, $R_1$ is a C1-20 linear or branched alkylene group or a C7-20 linear or branched arylalkylene group,

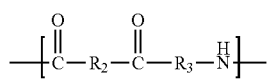
[Chemical Formula 2]

wherein, in the Chemical Formula 2, $R_2$ is a C1-20 linear or branched alkylene group, and $R_3$ is a C1-20 linear or branched alkylene group or a C7-20 linear or branched arylalkylene group.

6. The film for a tire inner liner according to claim 1, wherein the polyether-based segment includes a repeat unit of the following Chemical Formula 3:

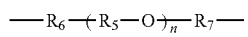
[Chemical Formula 3]

wherein, in the Chemical Formula 3,
$R_5$ is a C1-10 linear or branched alkylene group, n is an integer of from 1 to 100, and
$R_6$ and $R_7$ may be the same or different, and are respectively a direct bond, —O—, —NH—, —COO—, or —CONH—.

7. The film for a tire inner liner according to claim 1, wherein the copolymer comprises the polyamide-based segments and the polyether-based segments at a weight ratio of 6:4 to 3:7.

8. The film for a tire inner liner according to claim 1, wherein the base film layer comprises the polyamide-based resin and the copolymer at a weight ratio of 6:4 to 3:7.

9. The film for a tire inner liner according to claim 1, wherein the base film layer has a thickness of 30 μm to 300 μm, and the adhesive layer has a thickness of 0.1 μm to 20 μm.

10. The film for a tire inner liner according to claim 1, wherein the base film layer is an unstretched film.

11. The film for a tire inner liner according to claim 1, wherein the resorcinol-formalin-latex (RFL)-based adhesive comprises 2 wt % to 30 wt % of a condensate of resorcinol and formaldehyde, and 68 wt % to 98 wt % of a latex.

12. A method for manufacturing the film for a tire inner liner of claim 1, comprising:
supplying a mixture of a polyamide-based resin having a melt viscosity deviation of 3% or less from an average melt viscosity of the resin and a copolymer comprising polyamide-based segments and polyether-based segments and having a melt viscosity deviation of 3% or less from an average melt viscosity of the copolymer to an extrusion die through a feeder that is maintained at a temperature of 50° C. to 100° C.;
melting and extruding the supplied mixture at 230° C. to 300° C. to form a base film layer; and
forming an adhesive layer comprising a resorcinol-formalin-latex (RFL)-based adhesive on at least one surface of the base film,
wherein the polyether-based segments of the copolymer are included in the content of 15 wt % to 50 wt % based on total weight of the base film layer,
wherein the copolymer comprising polyamide-based segments and polyether-based segments has a weight average molecular weight of 50,000 to 300,000.

13. The method for manufacturing a film for a tire inner liner according to claim 12, wherein a difference between the thickness of the base film layer at a first point and the thickness of the base film layer at a second point located within 1 cm from the first point is within 2% relative to the thickness of the base film layer at the first point.

14. The method for manufacturing a film for a tire inner liner according to claim 12, wherein the maximum diameters of the polyamide-based resin and the copolymer are respectively 2 mm to 3 mm.

15. The method for manufacturing a film for a tire inner liner according to claim 12, wherein the extrusion die is a T type die.

16. The method for manufacturing a film for a tire inner liner according to claim 12, wherein the extrusion die has a die gap of 0.3 mm to 1.5 mm.

17. The method for manufacturing a film for a tire inner liner according to claim 12, further comprising a step of solidifying the base film layer that is formed by melting and extrusion in a cooling part that is maintained at a temperature of 5° C. to 40° C.

18. The method for manufacturing a film for a tire inner liner according to claim 17, wherein the solidifying step comprises uniformly adhering the base film layer formed by melting and extrusion to a cooling roll maintained at a temperature of 5° C. to 40° C., using at least one apparatus selected from the group consisting of an air knife, an air nozzle, and an electrostatic pinning device.

19. The method for manufacturing a film for a tire inner liner according to claim 12, further comprising a step of mixing the polyamide-based resin and the copolymer at a weight ratio of 6:4 to 3:7.

* * * * *